United States Patent [19]

Hecq et al.

[11] Patent Number: 5,061,874

[45] Date of Patent: * Oct. 29, 1991

[54] GLASS ARTICLE HAVING LOW SPECULAR REFLECTION

[75] Inventors: André Hecq, Nalinnes; François Toussaint, Montignies-le-Tilleul, both of Belgium

[73] Assignee: Glaverbel, Brussels, Belgium

[*] Notice: The portion of the term of this patent subsequent to Nov. 21, 2006 has been disclaimed.

[21] Appl. No.: 208,505

[22] Filed: Jun. 20, 1988

[30] Foreign Application Priority Data

Jun. 19, 1987 [LU] Luxembourg .............. 86925

[51] Int. Cl.$^5$ .................................. H01J 29/89
[52] U.S. Cl. .................................. 313/478; 313/479; 313/477 R; 313/112; 313/116; 358/252; 358/250; 428/171; 428/161; 359/580
[58] Field of Search ............ 313/477 R, 478, 479, 313/112, 116; 358/250, 252; 428/161, 171; 350/164, 166

[56] References Cited

U.S. PATENT DOCUMENTS

| | | | |
|---|---|---|---|
| 3,114,668 | 12/1963 | Guiles | 313/478 X |
| 3,490,982 | 1/1970 | Sauveniere | 65/31 |
| 3,504,212 | 3/1970 | Wollentin et al. | 313/478 X |
| 4,322,125 | 3/1982 | Warren | 350/1.6 |
| 4,419,397 | 12/1983 | Neat et al. | 428/141 |
| 4,476,463 | 10/1984 | Ng et al. | 340/712 |
| 4,731,558 | 3/1988 | Haisma et al. | 313/478 |
| 4,802,737 | 7/1989 | Denton | 350/166 |
| 4,880,677 | 11/1989 | Hecq et al. | 428/38 |
| 4,882,214 | 11/1989 | Hecq | 428/141 |

FOREIGN PATENT DOCUMENTS

| | | |
|---|---|---|
| 0131341 | 1/1985 | European Pat. Off. . |
| 1389509 | 10/1965 | France . |
| 89812 | 7/1967 | France . |
| 2025818 | 1/1970 | France . |
| 2228630 | 4/1974 | France . |
| 1151931 | 5/1969 | United Kingdom . |
| 2188925 | 10/1987 | United Kingdom . |

OTHER PUBLICATIONS

*Glass Technology,* vol. 26, No. 2, Apr., 1985, pp. 104–107, Ford, N., et al., "Integral antireflection films for glasses: a review".

*Primary Examiner*—Donald J. Yusko
*Assistant Examiner*—Michael Horabik
*Attorney, Agent, or Firm*—Spencer & Frank

[57] ABSTRACT

A glass article useful, for example, as a cathode ray tube screen, has a viewing light path which passes through at least one surface region over which the glass is matted by surface pits whereby unwanted specular reflection from that matted region is reduced. The light path also passes through a surface layer formed over a region of the glass so as to reduce the total light reflection from that region of the glass.

29 Claims, 3 Drawing Sheets

GLASS ARTICLE HAVING LOW SPECULAR REFLECTION

BACKGROUND OF THE INVENTION

1. Field of the Invention

This invention relates to a glass article having a viewing light path which passes through at least one surface region over which the glass is matted whereby specular reflection from the matted region is reduced.

2. Background of the Related Art

It is well known that light is reflected at a boundary between two media with different refractive indices. If the media are thick enough that interference effects can be ignored, the amount of normally incident light which will be reflected will be approximately $[(n1-n2)/(n1+n2)]^2$, where $n1$ and $n2$ are respectively the refractive indices of the two media. In the case of a glass/air interface, we can write $n1 \simeq 1.5$ and $n2 \simeq 1$, and the expression thus indicates that about 4% of light incident on a glass/air interface will be reflected at that interface, and about 8% will be reflected from the two surfaces of a glass sheet in air.

This reflection is a disadvantage for many purposes. As examples may be cited: instrument dial glasses, for example watch glasses; glass panels covering light emitting diode displays, and more particularly those covering liquid crystal displays; cathode ray tube screens, for example television screens and computer monitor screens; and sheets of glass held in picture frames to protect a photograph, painting or drawing.

Since it is the image of the light source on the glass which gives rise to problems in viewing through the glass, it has been proposed not so much to reduce the total amount of light reflected, as to reduce the proportion of reflected light which is reflected specularly. As an example, it is well known to etch the surface of glass so that its surface is matted, in that it is densely populated with pits which act to scatter surface-reflected light. As a result, a high proportion of the reflected light is reflected diffusely rather than specularly. An example of a method of producing such glass is set forth in Glaverbel's British Patent Specification No. 1,151,931.

Such surface matting also affects light transmitted by the glass, and a proportion of the light transmitted through such a matted region will also be diffuse. This can be an important disadvantage if it is desired to view an object or image located some distance behind the matted glass surface, since the diffusely transmitted light will make optical resolution of the object or image difficult or impossible. For example it will be appreciated that in television cathode ray tubes, especially in the larger sizes which are commercially available, the front glass may often be several centimetres thick, or a separate phosphor screen may be located several centimetres behind the front glass of the tube, and any matting treatment performed on the exterior surface of the screen will accordingly impair resolution of the image formed in the phosphorescent coating on the interior face of the screen.

SUMMARY OF THE INVENTION

It is a principal object of the present invention to provide a glass article having a viewing light path which has low specular reflection from at least one face at an end of that light path, without impeding good optical resolution of an object or image viewed along that path and which is simple and economical to produce.

According to the present invention, there is provided a glass article having a viewing light path which passes through at least one surface region over which the glass is matted whereby specular reflection from that matted region is reduced, characterised in that such light path passes through a surface layer formed over a region of the glass so as to reduce the total light reflection from that region of the glass.

A glass article according to the invention is very effective because it affords two complementary ways of reducing the specular reflection which gives rise to objectionable images or glare. The matted region of the glass does not, of itself, necessarily have any effect on the total proportion of incident light there reflected, but it does increase the amount of that reflected light which is reflected diffusely, and it reduces the amount which is reflected specularly. As a result the objectionable image is attenuated because the light is dispersed. The said surface layer also acts to attenuate the objectionable image because the total amount of reflected light is reduced. Thus in the case of a glass article according to the invention, not only is the total amount of reflected light reduced, but also, the proportion of that reflected light which is reflected specularly is reduced. The combination of these two different mechanisms acting simultaneously can give particularly efficacious low-reflection properties.

By appropriate choice of the extent by which total reflection on the one hand, and specular reflection on the other hand, are reduced, the adoption of the invention also affords a good compromise between the low-reflection properties of the article and good optical resolution of an object or image viewed through it. In fact the action of the said surface layer in reducing total reflection allows an appreciable attenuation of objectionable images without loss of optical resolution. The matted region of the glass on the other hand has the advantage of diffusing a part of the incident light without objectionably reducing the brightness of an object or image viewed through the article, or without objectionably attenuating a luminous image formed on a surface of the article. This is of particular importance in the case of screens for cathode ray tubes, such as television screens, computer monitor screens and screens of machines for dispensing money located in the exterior walls of buildings, as well as in the case of capacitive keys for giving commands to such dispensing machines. The perception of characters or other images formed on the screen is much less disturbed by the ambient illumination. Likewise an object which has been specially illuminated to achieve a desired optical effect can be viewed through an article according to this invention with very low disturbance due to environmental illumination.

The invention also affords a good compromise between an acceptable low-reflection property for the purpose in view, and a low added cost together with simplicity of manufacture. Obtaining the desired low specular reflection solely by forming appropriate surface layers, for example by coating with successive layers of reducing refractive index, can lead rapidly to high production costs as well as complicated manufacturing procedures due to coating the glass with a number of different materials. Matting the surface of the glass is simple and gives a product of relatively low cost, but it does present the risk of reducing optical resolution through the article. By combining the effects of forming a said surface layer and matting a region of the glass, an article according to the invention presents a commercially very desirable compromise.

In view of what has been said about difficulties of resolving an image through a matted glass article, it is somewhat surprising that one should choose to use a glass article having a matted surface region through which a viewing light path passes. In fact any diffusion of light at the matted surface need not be deleterious for good resolution in many instances. We have mentioned the problem of using a television screen whose exterior surface is matted. An article according to the invention can easily be adapted for use as a television screen by disposing the matted region of the glass to the interior of the cathode ray tube. Because in that way the matted region of the glass is in contact with the phosphorescent material, diffusion of an image formed in that phosphorescent material is barely appreciable. Low reflection from the exterior surface of such a screen can be assured by a said surface layer formed thereon.

DETAILED DESCRIPTION OF THE INVENTION

A region of the glass surface can be matted by forming thereon a vitreous phase containing a dispersion of very small crystals of silicon dioxide which are capable of diffusing light, or by forming thereon a coating of two different dispersed phases of which one can be eliminated easily. For example, in order to obtain a matted glass surface it is possible to make use of a phase separable glass such as a borosilicate glass. This can be deposited as a surface layer on an ordinary soda-lime glass article using a sol-gel deposition technique. A finely dispersed phase separation can be achieved by heat treatment and one of the phases can be attacked chemically to yield a porous diffusing surface. A simpler and more economic, and thus preferred technique is to attack the surface of an ordinary soda-lime glass with an etching solution, usually based on hydrofluoric acid, in order to form surface pits. If desired, silica can be added to the etching solution so as to deposit very small grains of silica on the glass to augument light dispersion. Preferably, at least one said matted region is occupied by a population of surface pits which matt the glass, since this can be done more simply and less expensively.

In the most preferred embodiments of the invention, the surface pits of said population are of such small area and profile that typed characters of 10-pitch size are clearly legible when viewed along said light path with the surface bearing said characters spaced from the surface bearing said population of pits by a distance of 10 cm. Upper case letters of 10-pitch size occupy a space 2.5 mm square. The adoption of this feature assures an optical resolution which is wholly satisfactory for most purposes. A matted region occupied by such a population of pits may for example be formed as an external surface of a large television screen. Such a distance of 10 cm between a said matted surface of an article according to the invention and an object or image to be viewed is quite sufficient for clear viewing of a cathode ray tube image and for many other purposes, for example for motor vehicle dash board instrument screens or glasses of measuring instruments. Because of the good optical resolution thereby afforded, perception of an image or object through the article is hardly affected.

Matted glass having such an optical resolution, and a method of manufacturing such matted glass are described in Glaverbel's British Patent Publication No. GB 2 188 925 A, Application No. 86 08 496 filed 8th Apr. 1986, which corresponds to U.S. Application No. 07/035,266 filed Apr. 6th, 1987, now U.S. Pat. No. 4,882,214 issued Nov. 21st, 1989 and the disclosure of that publication is imported into this specification by this cross-reference.

Advantageously, the surface pits of said population are of such small size that a disk having a diameter of 10 $\mu$m cannot be placed thereon without overlapping at least two pits. In fact it is especially preferred that such surface pits are so small that a disk having a diameter of 5 $\mu$m cannot be placed thereon without overlapping at least two pits. In practice, the test for the adoption of one or both of these features is performed on a photomicrograph, for example to a magnification of 1000 times using a disc of 10 mm or 5 mm as appropriate. The provision of a dense population of surface pits of such small size ranges is one of the factors which have an important effect in achieving good resolution when viewing an object through the glass. We have found that the smaller are the pits, the less is the effect of increasing the distance between a matted face of the glass and an object viewed through it on the ease with which details of the object can be resolved by a viewer.

For certain particular applications, such as screens of video monitors, requirements for optical quality are rather strict. For this reason, it is preferred that the surface of said matted region exhibits a total gloss of less than 60 units, and preferably less than 45 units, defined according to the standard set out in ASTM D523, light being incident at an angle of 60. Such a low level of gloss assures that an article according to the invention has sufficiently low-reflection properties that it is suitable for use as a computer monitor screen, meeting the standards required of such apparatus and assuring a good degree of visual comfort and reducing the eye fatigue which has been found to result from prolonged use.

Advantageously, said light path passes through a said surface layer, which layer comprises material which has an effective refractive index between that of said glass and that of a medium in contact with said surface layer. The expression "effective refractive index" is used herein to denote that the layer is formed of a material which in fact has a refractive index between that of the glass and that of the medium in contact with the layer, or that the layer is formed in such a way that it has the same optical effect as a layer having such an intermediate refractive index. Articles having this preferred feature of the invention are of especial interest for use as instrument dial glasses, cathode ray tube screens and vehicle dashboard screens.

In some preferred embodiments of the invention, said surface layer comprises a superficial coating deposited on the glass, such coating being of a material which has an effective refractive index between that of said glass and that of a medium in contact with said surface layer. This is a simple and efficacious way of ensuring that reflection of light at the coated face will be reduced. By way of example, for reducing reflection at an interface with air, one may cite coatings of the following materials: silicon dioxide having a refractive index (n) of 1.46; a silicone based polymer ($[(CH_3)_2SiO]n$) (n=1.4); magnesium fluoride (n=1.38); cryolite (n=1.33) and other materials whose use per se is known from the lens coating art. Teflon (Trade mark) (n=1.35) may also be used, this material having the advantages of having a good resistance to chemical attack and of being easy to form into a coating by vacuum deposition techniques. Other polymeric coating materials may also be used. It is especially preferred to choose the thickness of such a coating so as to achieve interference extinction of internally reflected visible light, thus further reducing the total reflection from the coated face.

An interference filter can also be formed by depositing a succession of two or more coatings of different materials whose thickness are well defined within tolerances of a few nanometres to give extinction of internally reflected light by interference. For example it is possible to make use of coating materials having a high refractive index such as titanium dioxide, aluminium oxide or zinc sulphide in combination with materials of lower refractive index such as magnesium fluoride or a non-stoichiometric silicon oxide, so that the outer coating layer has a lower refractive index than the glass. Various combinations alternating layers of high and low refractive index, and coatings may also be deposited from appropriate mixtures of different materials for achieving a desired refractive index.

Figure 1:
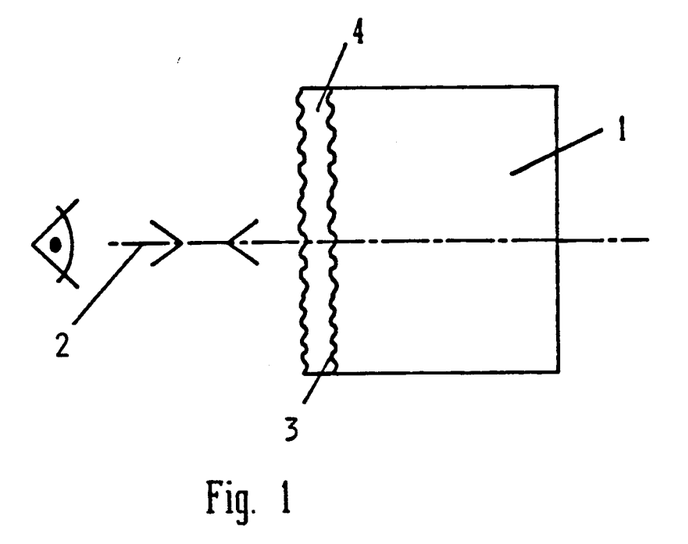
FIG. 1 schematically shows in cross-section an embodiment of the invention in which a superficial coating is deposited over a matted region of the glass.

Such a low-reflection coating may be deposited on an unmatted face of the glass article, but it is preferred that a said coating is deposited over a said matted region of the glass as schematically shown in cross-section in FIG. 1. Glass article 1 is shown as having a surface region 3 which is a matted region 3 provided with a population of surface pits and a surface layer 4 deposited over the matted region 3. This allows the reduction in reflection, especially specular reflection, for example, along viewing light path 2 from that face to be augumented without affecting transparency. This result is extremely surprising, because the effect of matting the glass in reducing specular reflection can only be attributed to the surface profile of the matted glass, and one would expect that any surface coating treatment, which must at least partially fill surface pits in the matted region, would destroy or at least reduce the diffusing effect of the matted region. We have found that this is not the case: indeed, with usual coating techniques and coating thicknesses, we have found that the diffusing effect over a matted and coated region is slightly augumented. It is not clear why this should be so, but we presently believe that it may be due to a preferential coating of the peaks on the glass surface between the pits, thus effectively deepening the pits in the coated surface region of the article and so slightly promoting diffusion of light reflected over that region. Of course, the practical fact of this advantage does not depend on this or any other theory.

Figure 2:
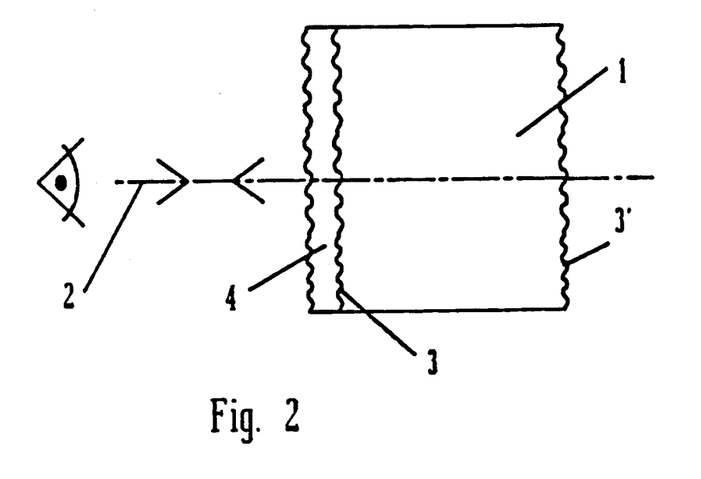
FIG. 2 schematically shows in cross-section an embodiment of the invention in which a surface region at opposite ends of a light path through the glass are both matted and one surface region is coated with a superficial coating.

Advantageously, surface regions at opposite ends of a light path through said article are both matted as shown schematically in cross-section in FIG. 2 in which surface regions 3 and 3' are both matted. By the adoption of this feature, the two matted faces both act to diffuse reflected light, and this strongly reduces specular reflection in a very simple manner. It is preferred that at least the surface region of the article which in use will be nearer the viewer is matted by a population of surface pits having a very small surface area, as has previously been described, in order to conserve good optical resolution, and preferably both such regions are so matted. Both such matted regions may be overcoated with a low-reflection coating if desired. FIG. 2 schematically shows one surface layer 4 deposited over matted region 3 which is nearer to a viewer in use. It is to be noted, however, that many materials used for forming such coatings are susceptible to damage, for example by abrasion, and in order to conserve the initial properties of the article it is accordingly preferred that such a coating be applied to a less readily accessible face of the article if such exists.

In order to reduce the total reflection from the surface of a glass article relying solely on a surface layer having a lower effective refractive index than the glass, it would be ideal that the value of the effective refractive index within that layer should vary continuously from the value of the refractive index of the glass to the value of the refractive index of the medium in contact with that layer. This ideal is of course impossible to achieve using low-reflection coatings since it presupposes an infinity of successive coating strata in the layer. The ideal situation can be approached by applying a succession of transparent coating strata having different indices of refraction whose values move step-wise from the value of the refractive index of the glass towards the value of the refractive index of the medium in contact with the layer, to form an interferential low-reflection filter. The number of coating strata to be used will depend on the desired low-reflection properties of the coated region and the price one is prepared to pay for the coated article. Each coating is costly to apply, and the various materials having the desired gradation of refractive index are often rather softer than glass so that they may be quite easily removed by abrasion. An excessive multiplication of coating strata on the glass is thus undesirable.

Figure 3A:
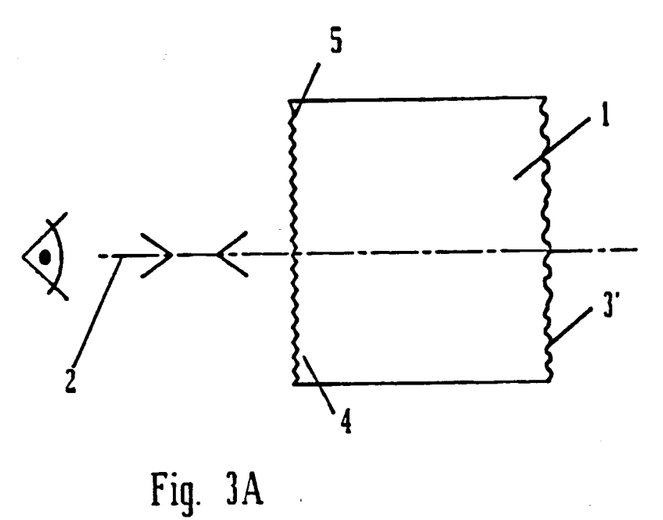
FIG. 3A schematically shows in cross-section an embodiment of the invention in which the superficial coating is a surface layer of the glass itself which is etched with a pattern of grooves.
Figure 3B:
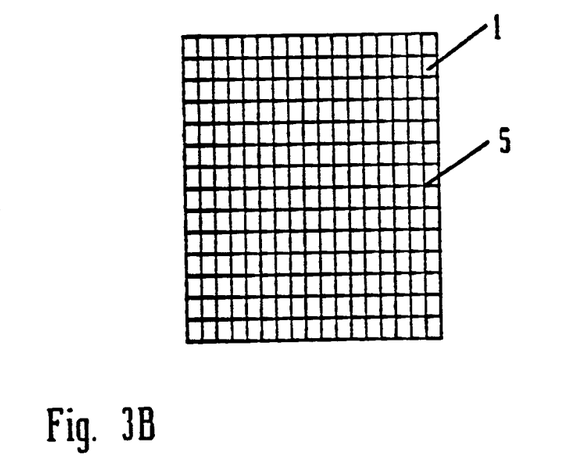
FIG. 3B is a schematic top view of the embodiment of FIG. 3A showing a pattern of grooves disposed mesh-wise.

We have found that a non-diffusing low-reflection layer can surprisingly be formed by treating the surface of the glass itself, as opposed to depositing a coating thereon as schematically shown in FIGS. 3A and 3B. In some preferred embodiments of the invention, therefore, a said surface layer is formed over a non-matted region of the glass, such surface layer comprising vitreous material which is etched with a pattern of grooves disposed mesh-wise to form a grid pattern, the dimension of the mesh being less than 0.5 μm, and preferably less than 0.1 μm. This is schematically shown in cross-section in FIG. 3A in which surface layer 4 is a layer or portion of the glass itself and is etched with a pattern of grooves 5. The pattern of grooves 5 is disposed mesh-wise to form a grid pattern as schematically shown in FIG. 3B which is a top view of FIG. 3A.

It is surprising that such a treatment does not lead to significant increase in diffusion at the surface layer due to parasitic reflections, but it does not. We presently believe that this is because the dimension of the mesh is so small, less than the wavelength of at least part of the visible spectrum, and that diffusion of light having wavelengths greater than the mesh dimension does not occur. We also believe that, because of the very small mesh size, the layer, which consists of peaks of residual glass and valleys (mesh lines) filled with the contacting medium, can be treated as being of uniform composition over its area, that composition being effectively an intimate mixture of the glass and the contacting medium. Accordingly, the layer necessarily has a refractive index whose effective value is between the values of the refractive indices of the glass and of the contacting medium. Furthermore, it is relatively easy to form the grooves of the pattern so that they are substantially V-shaped in cross-section, though the peaks between the grooves may tend to be somewhat rounded. As a result of this V-shaping, a notional stratum of the layer close to the bases of the grooves will contain much glass and relatively little of the contacting medium. Its effective refractive index will accordingly be close to that of the glass. Successive strata will contain proportionately less glass and more of the contacting medium, and there will accordingly be a smooth gradation in the effective refractive index of the layer through its thickness from the glass to the contacting medium. This gives a very close approximation to the ideal situation for reducing reflection by operating on the refractive index of a layer at an interface between two media, without the need to deposit any coating material at that interface.

The optimum mesh size of the grid pattern is dependent upon the wavelength of the light to which the article will be subjected during normal use. For low reflection of light of wavelengths corresponding to yellow to near infrared, very good low-reflection properties are achieved by using a grid pattern of mesh size slightly less than 0.5 μ. For good results over the entire visible spectrum, the mesh size should be rather less than 0.5 μm, and is preferably less than 0.1 μm. With such a very small mesh size, it is possible to avoid the appearance of a slightly bluish aspect of the treated face, and a colourless aspect can be achieved.

One way of etching such a pattern is to apply a layer of photosensitive resin to the surface to be etched, and to expose the resin to a source of radiation, such as ultra-violet light, through a mask bearing a desired design, to form a developable image. After development using a suitable solvent to form an acid-resist, the pattern-wise coated face of the glass is subjected to the action of an acid etching medium based on hydrofluoric acid. The resist is then removed from the glass, for example using fuming nitric acid, to leave a glass surface bearing the desired etched pattern of grooves.

The mean depth of the grooves of said mesh is preferably greater than 0.1 μm, since this allows a very appreciable reduction in the luminous reflectivity of the thus treated surface. A mean groove depth of between 0.1 μm and 1 μm gives a sufficient reduction in reflectivity.

An article according to the invention which has one face etched mesh-wise as aforesaid and one face matted has excellent low-reflection properties while being highly resistant to damage by abrasion or atmospheric pollution, and having regard to its quality, is relatively inexpensive to manufacture.

The glass used for forming the article may be an absorbent (though of course not opaque) glass if that is desired, for example for viewing very brightly lit objects, in order to reduce the amount of light which is transmitted. The use of an absorbent glass also has the advantage of reducing perceived reflection from the face of the article which is remote from the observer, due to absorption within the thickness of the glass of light reflected at that far face. For example a cathode ray tube screen can be formed of grey glass having a sufficient degree of light transmissivity. It is generally preferred, however, that the glass is clear glass. This allows a better observation of objects or images through the article, especially if they should be poorly illuminated. It is to be noted that the use of clear glass accentuates the problem of light reflection at the far face of the article, since very little will be absorbed by the glass.

A glass article according to the invention can be embodied in many forms. It may for example be constituted by a single, monolithic piece of glass, or by a laminate comprising two or more pieces of glass interleaved by plastics film material for example polyvinyl butyral. The article may take the form of a flat or curved sheet, or it may be prismatic or lenticular. By suitable choice of treatment, such articles may be used as instrument dial glasses, dashboard screens of vehicles, magnifying glasses, spectacle lenses, cathode ray tube screens, in picture or other display frames, and in optical systems such as in binoculars and telescopes.

The invention in particular includes a glass article as defined in the claims appendent hereto which is constituted as a cathode ray tube screen. Use as a cathode ray tube screen is an especially interesting application of an article according to this invention. Such a screen may be placed in front of a cathode ray tube, but it can also itself be bonded to a cone to constitute the front of the tube. Such an article could also be glued or laminated to the front glass of a tube.

Figure 4:
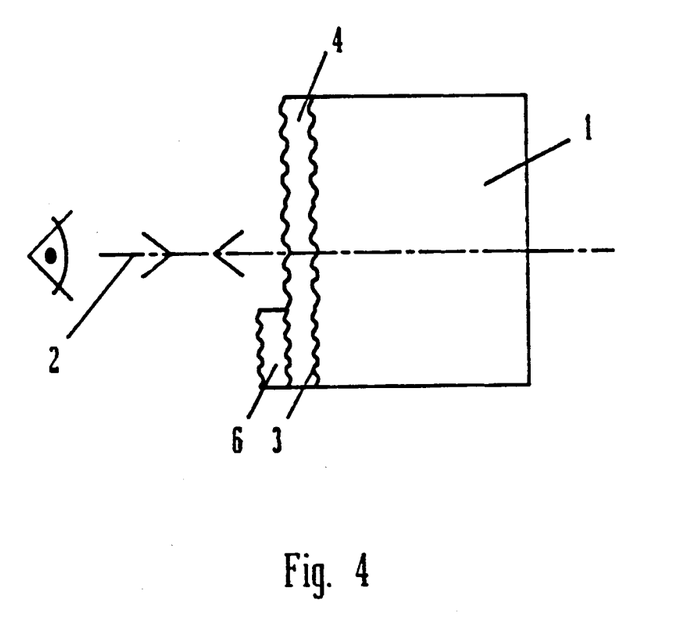
FIG. 4 schematically shows in cross-section an embodiment of the invention.

In some preferred embodiments of cathode ray tube screen according to the invention, such screen bears over at least one face portion, a transparent conductive coating forming part of a control circuit as shown in FIG. 4. This permits the integration of command keys for a device, such as a computer, which controls the cathode ray tube. A particular example of such a device is the cathode ray tube of an automatic bank-note dispenser which may have different command keys located over different regions of its screen.

If applied to the major portion of the screen, such a coating may also serve as an interactive key allowing for example drawings to be made on the screen which can be directly memorised and operated upon by a computer.

Such a coating may be continuous, which facilitates deposition of the coating, or it may be applied according to some design, for example patch-wise. FIG. 4 shows the glass articles of FIG. 1 additionally provided with a transparent conductive coating 6 which is not continuous. In the case of a continuous coating, the point of contact of a user's finger can be calculated by a data processing circuit on the basis of the resistivity of the conductive coating.

Said transparent conductive coating preferably comprises a coating of tin oxide or indium-tin oxide. These materials are particularly well adapted for forming transparent conductive coatings for use as capacitive-type command keys.

If desired, after matting and before any coating deposition, the glass may be subjected to a chemical tempering treatment in order to increase its resistance to breakage, Also, the glass used can be dealkalised glass.

Preferred embodiments of the invention will now be described by way of Example.

EXAMPLE 1

In order to matt a sheet of drawn soda-lime glass having a thickness of 1.5 mm, the sheet was given a preliminary washing treatment in which the glass was washed with an initial acid-washing solution containing by volume 1% hydrofluoric acid and 6% sulphuric acid in water, for several minutes at ambient temperature. After this initial acid-washing treatment, the glass was rinsed and dipped in a bath containing glycerine and water to leave a film of glycerine on the surface of the glass. The glycerine-coated glass was then dipped in an etching bath containing an aqueous solution of potassium bifluoride (between 70 and 120 g/L) at ambient temperature (approximately 20 C.) for a period of between 30 and 60 seconds. The glass was removed and rinsed in water and was then immersed in a chemical polishing bath containing 10% hydrofluoric acid and 4% sulphuric acid (aqueous) for 2 minutes at ambient temperature, and then again rinsed. An electronmicrograph of the resulting surface to a scale of 1000 times shows a dense population of surface pits which have a rounded profile with a maximum dimension of less than 5 $\mu$m and a depth of the order of 0.4 $\mu$m. It is not possible to place a 5 mm disk (5 $\mu$m $\times$ 1000) on that micrograph without overlapping at least two of the pits.

It was found that the ordinary typescript in characters of 10-pitch size could easily be read through the resulting matted glass when the typescript was held 60 cm away from the eye, no matter where the glass was held between the eye and the typescript, provided only that the glass was oriented at an angle of more than 10 to the line of sight.

It was also found that an object placed several metres behind the glass could easily be viewed through it with substantially no loss of resolution.

The specular reflection at 60 of the thus treated sheet was measured according to ASTM D523, using an apparatus sold under the Trade mark Glossgard II by the firm Gardner, Bethesda, MD 20014, U.S.A., and a total gloss for the two faces of 75 units was found.

One one face of the glass a low-reflection coating of Teflon (Trade mark) was formed to a thickness of about 95 nm by a radio-frequency vacuum deposition technique from a plasma in a target magnetron. The gloss measured in the same way at the thus coated face was 35 units, and at the non-coated face, the gloss was 63 units. Before the sheet had been treated as described in this Example, its gloss was about 165 units.

A thus treated article is very suitable for use as a video monitor screen for example of a computer, especially when the coated face is turned towards the user.

EXAMPLE 2

A sheet of clear soda-lime glass having a thickness of 2 mm is placed and held vertically on a conveyor moving at a speed of 2 m/min in order to matt one of its faces. In order to treat only one face, it is possible to place two sheets in back-to-back contact so that only one face of each is treated. The sheet is first copiously wetted with a rinsing agent containing 98% demineralised water, 1% oil and 1% surfactant, in this case sodium tripolyphosphate. After partial drying in order to remove excess liquid and leave residual surface moisture of 1 g/m2, the sheet, at a surface temperature of 35 C., passes into a tunnel chamber in which there is an air current and in which a face of the sheet is sprayed with an ordinary commercial solution of 50% hydrofluoric acid in such a manner that only droplets having a diameter between 100 $\mu$m and 200 $\mu$m contact the glass. After a dwell time of about two and a half minutes, the sheet is drenched with ordinary water and is then dried.

The thus matted face of the sheet has the property of reflecting light diffusely, while remaining transparent, that is without affecting its luminous transmission. Any image placed 2 cm behind the sheet can be observed quite clearly provided that the sight path through the sheet is at an angle of less than 70 to the normal to that sheet.

The specular reflection at 60 of that sheet was measured as in Example 1, and a total gloss value of 86 units was recorded at the matted face.

A low-reflection coating of magnesium fluoride was deposited onto the matted face of that sheet by vacuum evaporation. The gloss at the matted and coated face of the sheet was 50 units.

In a variant of this Example, the low-reflection coating was constituted by an interference filter having two constituents, namely titanium dioxide and magnesium fluoride. The gloss at the coated face was 45 units.

In another variant of this Example, the low-reflection coating of magnesium fluoride was formed on the non-matted face of the sheet, and a conductive coating of stannic oxide 140 nm thick was formed on the matted face. The gloss measured at the stannic oxide coated face was 110 units. A 2 mm thick sheet of glass bearing a coating of stannic oxide 140 nm thick but otherwise untreated has a total gloss of about 270 units measured at the coated face.

EXAMPLE 3

One face of a 3 mm thick sheet of clear soda-lime glass is matted with a population of pyramidal surface pits. To achieve this, the sheet is washed, rinsed and dried, and a thin uniform film of etching acid is applied and left for a dwell time of 20 seconds, after which the sheet is washed and dried. The etching acid used is made in the following way: 88 mL of 70% solution of Hydrofluoric acid are added to 112 mL sulphuric acid at 41 Baum and 30 g ammonium bifluoride is then added.

The other face of the glass sheet is then subjected to the following treatment.

A layer of photo-sensitive resin HPR 204 from Olin Hunt Chemical is applied to that other face of the sheet. A quartz mask bearing a grid pattern with a mesh dimension of about 0.3 $\mu$m is applied to the resin coating and the resin is exposed through the mask to a source of ultra-violet radiation. This operation is repeated as often as necessary so that the whole area of the resin-coated sheet face is pattern-wise exposed. It may be noted that the mask overlapped a previously exposed area on each later exposure, and that it was not necessary for the exposure patterns of successive exposures to be precisely aligned.

After development using the solvent supplied for that purpose by Olin Hunt Chemical, the resin which remained formed an acid-resist which would protect certain areas of the glass surface from chemical attack. The face bearing the resist was then subjected to attack by a 1% solution of hydrofluoric acid at 18 C. for a little under one minute, and was then rinsed for several minutes. The resist was removed by exposing it to the action of fuming nitric acid for several minutes. A grid pattern of grooves was thus etched into the surface of the glass to a depth of 0.1 μm. The total reflection under normal incidence from the grid-wise etched face of the glass for visible light having wavelengths between 350 nm and 750 nm was about 0.6%, as compared with about 4% for that face before that treatment.

The gloss exhibited by the sheet was 73 units measured at the matted face, and 65 units measured at the grid-wise etched face.

In a variant of this Example, a 140 nm thick conductive coating of stannic oxide was deposited on the matted face of the sheet. The gloss measured at that face was 100 units.

In a second variant, a low-reflection coating of magnesium fluoride was deposited on the matted face of the sheet. The gloss exhibited by the sheet was then 30 units measured at the matted and coated face, and 35 units measured at the grid-wise etched face.

In a third variant, the matted face was matted by a matting treatment as described in Example 1, only one face of the sheet being treated. The optical resolution through the sheet was considerably improved, while the specular reflection was reduced to a similar extent.

EXAMPLE 4

One face of a clear soda-lime glass sheet 1.1 mm in thickness is matted with surface pits in a manner similar to that described in Example 1. In order to avoid pitting of the other face of the sheet that face was protected with a peelable layer of varnish prior to matting. Also, the glass was only left immersed in a bath containing the potassium bifluoride solution for about 20 seconds. The pits etched in the glass had a depth of about 0.2 μm. Measured at the matted face, the gloss of the thus treated sheet was 120 units. A 90 nm thick coating of silicon dioxide was deposited on the matted face of the sheet, and the gloss was reduced to 110 units.

This article can be used for example for forming the face of a ferroelectric liquid crystal carrying a liquid crystal layer 1.5 μm in thickness. To this end, a conductive coating of indium-tin oxide 200 nm thick is deposited on the matted face by cathodic sputtering under vacuum and is then engraved as a grid to define the different liquid crystal cells.

We claim:

1. A glass article, comprising:
   a glass substrate having at least one matted surface region so as to reduce specular reflection from said at least one matted surface region as light passes therethrough along a viewing light path; and
   a layer formed over a surface region of said glass substrate so as to reduce total light reflection from said surface region of the glass substrate as light passes therethrough along said viewing light path,
   wherein at least one of said at least one matted surface region is densely populated with surface pits which have a rounded profile produced by chemical etching, and which are of such small area that typed characters of 10-pitch size disposed on a surface to be viewed are clearly legible when viewed along said viewing light path when said surface to be viewed is spaced from the at least one matted surface region bearing said surface pits by a distance of 10 cm.

2. The glass article according to claim 1, wherein the surface of said at least one matted surface region exhibits a total gloss of less than 60 units defined according to the standard set out in ASTM D523, light being incident at an angle of 60 degrees.

3. The glass article according to claim 1, wherein said viewing light path passes through said layer, which layer comprises material which has an effective refractive index between that of the glass substrate and that of a medium in contact with said layer.

4. The glass article according to claim 3, wherein said layer is deposited over one of said at least one matted surface region of the glass article.

5. The glass article according to claim 1, wherein matted surface regions are provided at opposite ends of said viewing light path through said glass article.

6. The glass article according to claim 1, wherein the glass article is comprised of clear glass.

7. The glass article according to claim 1, wherein the glass article is a cathode ray tube screen.

8. The glass article according to claim 7, wherein said cathode ray tube screen has at least one face portion and a transparent conductive coating forming part of a control circuit provided over said at least one face portion.

9. The glass article according to claim 8, wherein said transparent conductive coating comprises one of tin oxide or indium-tin oxide.

10. The glass article according to claim 1, wherein the surface of said at least one matted surface region exhibits a total gloss of less than 45 units defined according to the standard set out in ASTM D523, light being incident at an angle of 60 degrees.

11. A glass article comprising:
    a glass substrate having at least one matted surface region so as to reduce specular reflection from said at least one matted surface region as light passes therethrough along a viewing light path; and
    a layer formed over a surface region of said glass substrate so as to reduce total light reflection from said surface region of the glass substrate as light passes therethrough along said viewing light path,
    wherein at least one of said at least one matted surface region is occupied by a population of surface pits which matt the glass, and
    wherein the surface pits of said population of surface pits are of such small size that a disk having a diameter of 10 μm cannot be placed thereon without overlapping at least two pits.

12. The glass article according to claim 11, wherein the surface of said at least one matted surface region exhibits a total gloss of less than 60 units defined according to the standard set out in ASTM D523, light being incident at an angle of 60 degrees.

13. A glass article according to claim 11, wherein said viewing light path passes through said layer, which layer comprises material which has an effective refractive index between that of the glass substrate and that of a medium in contact with said layer.

14. The glass article according to claim 13, wherein said layer is deposited over one of said at least one matted surface region of the glass article.

15. The glass article according to claim 11, wherein matted surface regions are provided at opposite ends of said viewing light path through said glass article.

16. The glass article according to claim 11, wherein the glass article is comprised of clear glass.

17. The glass article according to claim 11, wherein the glass article is a cathode ray tube screen.

18. The glass article according to claim 17, wherein said cathode ray tube screen has at least one face portion and a transparent conductive coating forming part of a control circuit provided over said at least one face portion.

19. The glass article according to claim 18, wherein said transparent conductive coating comprises one of tin oxide or indium-tin oxide.

20. The glass article according to claim 11, wherein the surface of said at least one matted surface region exhibits a total gloss of less than 45 units defined according to the standard set out in ASTM D523, light being incident at an angle of 60 degrees.

21. The glass article according to claim 11, wherein the surface pits have a rounded profile produced by chemical etching.

22. A glass article, comprising:
 a glass substrate having at least one matted surface region so as to reduce specular reflection from said at least one matted surface region as light passes therethrough along a viewing light path; and
 a grooved surface region which is non-matted and which is etched with a pattern of grooves disposed mesh-wise to form a grid pattern, the grooves being spaced apart by a distance of less than 0.5 μm so as to reduce total light reflection from said grooved surface region as light passes therethrough along said viewing light path,
 wherein at least one of said at least one matted surface region is occupied by a population of surface pits which matt the glass, and
 wherein the surface pits of said population are of such small area and profile that typed characters of 10-pitch size disposed on a viewing surface are clearly legible when viewed along said viewing light path when said viewing surface is spaced from the surface bearing said population of pits by a distance of 10 cm.

23. The glass article according to claim 22, wherein the grooves are spaced apart by a distance of less than 0.1 μm.

24. The glass article according to claim 22, wherein the grooves have a mean depth which is greater than 0.1 μm.

25. The glass article according to claim 22, wherein said at least one matted surface region and said grooved surface region occupy opposing surfaces of said glass substrate.

26. A glass article, comprising:
 a glass substrate having at least one matted surface region so as to reduce specular reflection from said at least one matted surface region as light passes therethrough along a viewing light path; and
 a grooved surface region which is non-matted and which is etched with a pattern of grooves disposed mesh-wise to form a grid pattern, the grooves being spaced apart by a distance of less than 0.5 μm so as to reduce total light reflection from said grooved surface region as light passes therethrough along said viewing light path,
 wherein at least one of said at least one matted region is occupied by a population of surface pits which matt the glass, and
 wherein the surface pits of said population are of such small size that a disk having a diameter of 10 μm cannot be placed thereon without overlapping at least two pits.

27. The glass article according to claim 26, wherein the grooves are spaced apart by a distance of less than 0.1 μm.

28. The glass article according to claim 26, wherein the grooves have a mean depth which is greater than 0.1 μm.

29. The glass article according to claim 26, wherein said at least one matted surface region and said grooved surface region occupy opposing surfaces of said glass substrate.

* * * * *